US012597742B2

(12) United States Patent
Plant et al.

(10) Patent No.: US 12,597,742 B2
(45) Date of Patent: Apr. 7, 2026

(54) ELECTRIC VEHICLE SUPPLY EQUIPMENT AND POWER CORD

(71) Applicant: Aptiv Technologies AG, Schaffhausen (CH)

(72) Inventors: Mark A. Plant, Boardman, OH (US); Wyatt Lipinsky, Youngstown, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 297 days.

(21) Appl. No.: 18/369,501

(22) Filed: Sep. 18, 2023

(65) Prior Publication Data

US 2024/0106174 A1 Mar. 28, 2024

Related U.S. Application Data

(60) Provisional application No. 63/409,279, filed on Sep. 23, 2022.

(51) Int. Cl.
*H01R 13/66* (2006.01)
*H01R 43/20* (2006.01)

(52) U.S. Cl.
CPC ..... *H01R 13/6691* (2013.01); *H01R 13/6683* (2013.01); *H01R 43/205* (2013.01)

(58) Field of Classification Search
CPC ............ H01R 13/6691; H01R 13/6683; H01R 43/205
USPC ..................................................... 439/620.22
See application file for complete search history.

(56) References Cited

U.S. PATENT DOCUMENTS

| | | | | |
|---|---|---|---|---|
| 8,202,124 | B1 | 6/2012 | Natter et al. | |
| 9,463,702 | B2 | 10/2016 | Fukushima et al. | |
| 9,634,435 | B1 | 4/2017 | Raschilla et al. | |
| 9,634,438 | B2 * | 4/2017 | Chaumeny | G01K 7/22 |
| 10,291,065 | B2 * | 5/2019 | Chan | G01R 21/133 |
| 11,506,541 | B2 | 11/2022 | Borin | |
| 2012/0309231 | A1 * | 12/2012 | Nguyen | H01R 13/6658 439/620.22 |
| 2014/0167799 | A1 * | 6/2014 | Wang | G01R 1/36 361/220 |
| 2016/0039297 | A1 | 2/2016 | Kretschmer et al. | |
| 2016/0082852 | A1 | 3/2016 | Kim | |

(Continued)

FOREIGN PATENT DOCUMENTS

| | | | |
|---|---|---|---|
| DE | 102015004313 | A1 | 10/2016 |
| DE | 202022104351 | U1 | 8/2022 |
| GB | 1600056 | A | 10/1981 |

OTHER PUBLICATIONS

"Extended European Search Report"; European Patent Office; mailed on Feb. 15, 2024; 9 pages.

*Primary Examiner* — Gary F Paumen
(74) *Attorney, Agent, or Firm* — Billion & Armitage

(57) ABSTRACT

The electric vehicle supply equipment described herein includes one or more power cords this is/are configured to be disconnected from and reconnected to the electrical vehicle supply equipment. The electric vehicle supply equipment so includes a printed circuit board assembly disposed within a plug of the power cord having an electronic controller configured to transmit data regarding a connector blade configuration of the plug and a printed circuit board assembly housing enclosing the printed circuit board assembly. The printed circuit board assembly housing is disposed within a plug housing of the plug.

20 Claims, 4 Drawing Sheets

(56) References Cited

U.S. PATENT DOCUMENTS

| | | | | |
|---|---|---|---|---|
| 2016/0093988 | A1* | 3/2016 | Yue | A41D 1/005 361/103 |
| 2016/0104978 | A1 | 4/2016 | Chaumeny et al. | |
| 2016/0195435 | A1 | 7/2016 | Krueger et al. | |
| 2016/0288658 | A1 | 10/2016 | Rudolph et al. | |
| 2017/0288456 | A1 | 10/2017 | Chan et al. | |
| 2018/0361862 | A1 | 12/2018 | Hein et al. | |
| 2023/0049141 | A1 | 2/2023 | Borin | |
| 2023/0099692 | A1 | 3/2023 | Raschilla et al. | |

* cited by examiner

ELECTRIC VEHICLE SUPPLY EQUIPMENT AND POWER CORD

CROSS-REFERENCE TO RELATED APPLICATION

This application claims benefit of priority to U.S. Provisional Patent Application No. 63/409,279 filed on Sep. 29, 2022, the entire disclosure of each of which is hereby incorporated by reference.

TECHNICAL FIELD OF THE INVENTION

The invention generally relates to electric vehicle supply equipment, particularly electric vehicle supply equipment having an interchangeable power cord.

BACKGROUND

Power cords for Electric Vehicle Supply Equipment (EVSE) are typically permanently attached to the EVSE. This then requires a different EVSE to be used with different alternating current (AC) power receptacles, e.g., National Electrical Manufactures Association (NEMA) 5-15 receptacles for 120 volt AC power versus NEMA 14-50 receptacles for 220 volt AC power. This is partly driven by the requirement for the power cord to be compatible with the voltage and current requirements of the EVSE. There may also be a need to monitor the temperature of the connector blades in the plug of the power cord in order to control the EVSE to avoid overtemperature conditions in the plug by reducing or discontinuing the power draw through the power cord when the temperature of the connector blades exceed a preset threshold. The monitoring of the connector blade temperature is typically performed using a dedicated temperature sensor, e.g., thermistor, located near each of the connector blades. Each of these temperature sensors usually require two dedicated wires in the power cord to communicate the connector blade temperatures to the EVSE, thereby increasing the size and decreasing the flexibility of the power cord. An EVSE/power cord combination that can avoid these issues remains desired.

SUMMARY

According to one or more aspects of the present disclosure, electric vehicle supply equipment includes one or more power cords configured to be disconnected from and reconnected to the electrical vehicle supply equipment; a printed circuit board assembly disposed within a plug of the power cord having an electronic controller configured to transmit data regarding a connector blade configuration of the plug; and a printed circuit board assembly housing enclosing the printed circuit board assembly. The printed circuit board assembly housing is disposed within a plug housing of the plug.

In some aspects of the electrical vehicle supply equipment described in the previous paragraph, the printed circuit board assembly further includes an electronic temperature sensor in communication with the electronic controller and located proximate to a connector blade of the plug. The electronic controller is configured to output temperature data of the connector blade based on a signal provided by the electronic temperature sensor.

In some aspects of the electrical vehicle supply equipment described in any one of the previous paragraphs, the electronic controller is configured to transmit temperature data of the connector blade to the electric vehicle supply equipment via a two wire interface.

In some aspects of the electrical vehicle supply equipment described in any one of the previous paragraphs, the printed circuit board assembly housing is configured to locate the electronic temperature sensor relative to the connector blade within the plug housing within a predetermined dimensional tolerance.

In some aspects of the electrical vehicle supply equipment described in any one of the previous paragraphs, the printed circuit board assembly housing defines locating features that engage corresponding locating features in the plug housing to locate the electronic temperature sensor relative to the connector blade within the plug housing within a predetermined dimensional tolerance.

In some aspects of the electrical vehicle supply equipment described in any one of the previous paragraphs, the printed circuit board assembly housing includes a case portion in which the printed circuit board assembly is disposed, and a cover portion configured to enclose the printed circuit board assembly within the printed circuit board assembly housing.

In some aspects of the electrical vehicle supply equipment described in any one of the previous paragraphs, the case portion is connected to the cover portion by a living hinge.

In some aspects of the electrical vehicle supply equipment described in any one of the previous paragraphs, the printed circuit board assembly housing is configured to provide electrostatic discharge protection for the printed circuit board assembly.

In some aspects of the electrical vehicle supply equipment described in any one of the previous paragraphs, the printed circuit board assembly housing is configured to provide protection for the printed circuit board assembly against physical damage prior to installation of the printed circuit board assembly in the plug housing.

In some aspects of the electrical vehicle supply equipment described in any one of the previous paragraphs, the electronic controller is configured to transmit the data regarding the connector blade configuration of the plug of the power cord to the electric vehicle supply equipment via a two wire interface.

In some aspects of the electrical vehicle supply equipment described in any one of the previous paragraphs, the connector blade configuration of the plug is selected from a list consisting of National Electrical Manufactures Association 5-15P, 6-15P, 6-30P, and 6-50P, Europlug CCE 7/16, British Standard (BS) 1363, Australian/New Zealand Standard AS/NZS 3112, and Chinese PPCS-CCC technical standards.

According to one or more aspects of the present disclosure, a power cord configured for use with electric vehicle supply equipment includes a printed circuit board assembly having an electronic controller configured to transmit data regarding a connector blade configuration of a plug of the power cord; and a printed circuit board assembly housing enclosing the printed circuit board assembly. The printed circuit board assembly housing is disposed within a plug housing of the plug.

In some aspects of the power cord described in the previous paragraph, the power cord further includes an electronic temperature sensor in communication with the electronic controller and located proximate to a connector blade of the plug. The electronic controller is configured to output temperature data of the connector blade based on a signal provided by the electronic temperature sensor.

In some aspects of the power cord described in any one of the previous paragraphs, the printed circuit board assembly housing defines locating features that engage corresponding locating features in the plug housing to locate the electronic temperature sensor relative to the connector blade within the plug housing within a predetermined dimensional tolerance.

In some aspects of the power cord described in any one of the previous paragraphs, the printed circuit board assembly housing includes a case portion in which the printed circuit board assembly is disposed, and a cover portion configured to enclose the printed circuit board assembly within the printed circuit board assembly housing.

In some aspects of the power cord described in any one of the previous paragraphs, the printed circuit board assembly housing is configured to provide electrostatic discharge protection and protection for the printed circuit board assembly against physical damage prior to installation of the printed circuit board assembly in the plug housing for the printed circuit board assembly.

In some aspects of the power cord described in any one of the previous paragraphs, the connector blade configuration of the plug is selected from a list consisting of National Electrical Manufactures Association 5-15P, 6-15P, 6-30P, and 6-50P, Europlug CCE 7/16, British Standard (BS) 1363, Australian/New Zealand Standard AS/NZ S 3112, and Chinese PPCS-CCC technical standards.

According to one or more aspects of the present disclosure, a method of assembling a power cord includes disposing a printed circuit board assembly having an electronic controller configured to transmit data regarding a connector blade configuration of a plug of the power cord and an electronic temperature sensor in communication with the electronic controller within a printed circuit board assembly housing; disposing the printed circuit board assembly housing within a plug housing of the plug; and positioning the electronic temperature sensor relative to the connector blade within the plug housing within a predetermined dimensional tolerance by engaging locating features in the printed circuit board assembly housing with corresponding locating features in the plug housing.

In some aspects of the method described in the previous paragraph, the method further includes disposing the printed circuit board assembly within a case portion of the printed circuit board assembly housing; and enclosing the printed circuit board assembly within the printed circuit board assembly housing using a cover portion of the printed circuit board assembly housing joined to the case portion by a living hinge.

In some aspects of the method described in any one of the previous paragraphs, the connector blade configuration of the plug is selected from a list consisting of National Electrical Manufactures Association 5-15P, 6-15P, 6-30P, and 6-50P, Europlug CCE 7/16, British Standard (BS) 1363, Australian/New Zealand Standard AS/NZ S 3112, and Chinese PPCS-CCC technical standards.

BRIEF DESCRIPTION OF THE DRAWINGS

The present invention will now be described, by way of example with reference to the accompanying drawings, in which.

DETAILED DESCRIPTION

Figure 1:
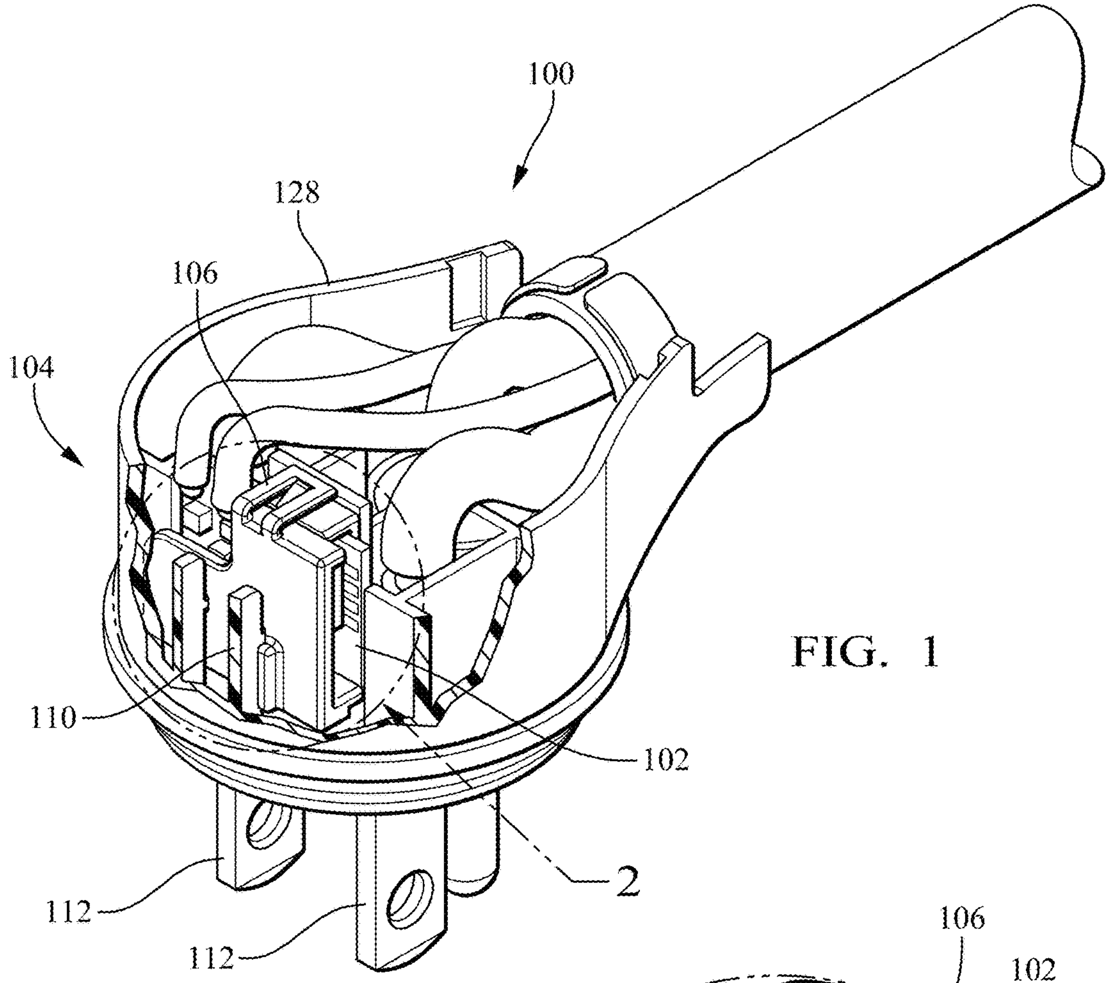
FIG. 1 shows a transparent isometric view of a power cord for electric vehicle supply equipment according to some embodiments.
Figure 2:
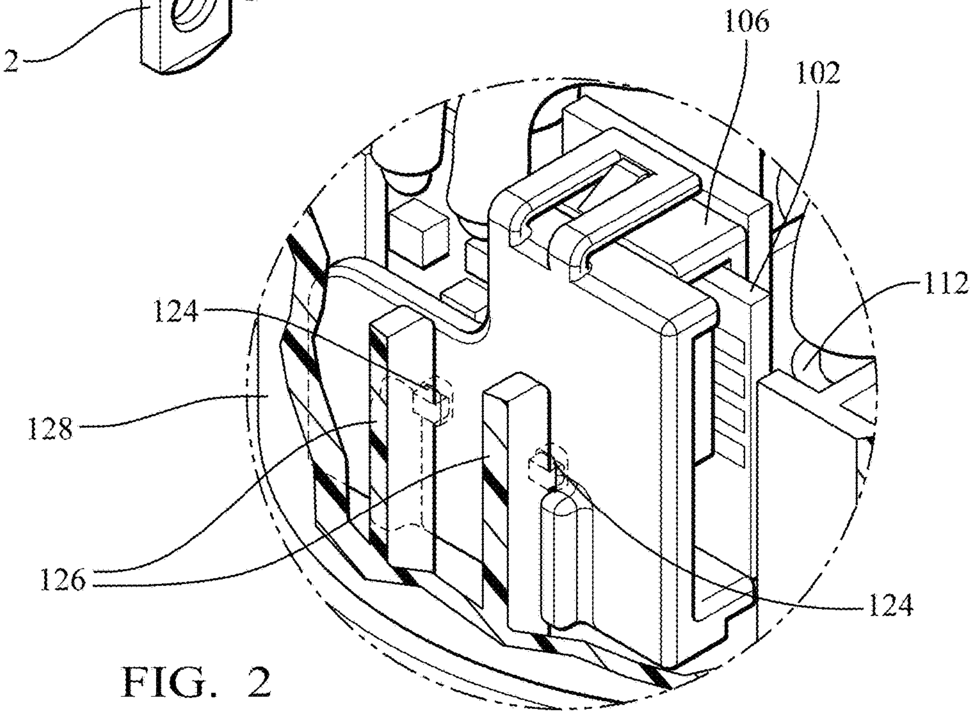
FIG. 2 shows a close-up cut-away isometric view of a printed circuit board assembly in the power cord of FIG. 1 according to some embodiments.
Figure 3:
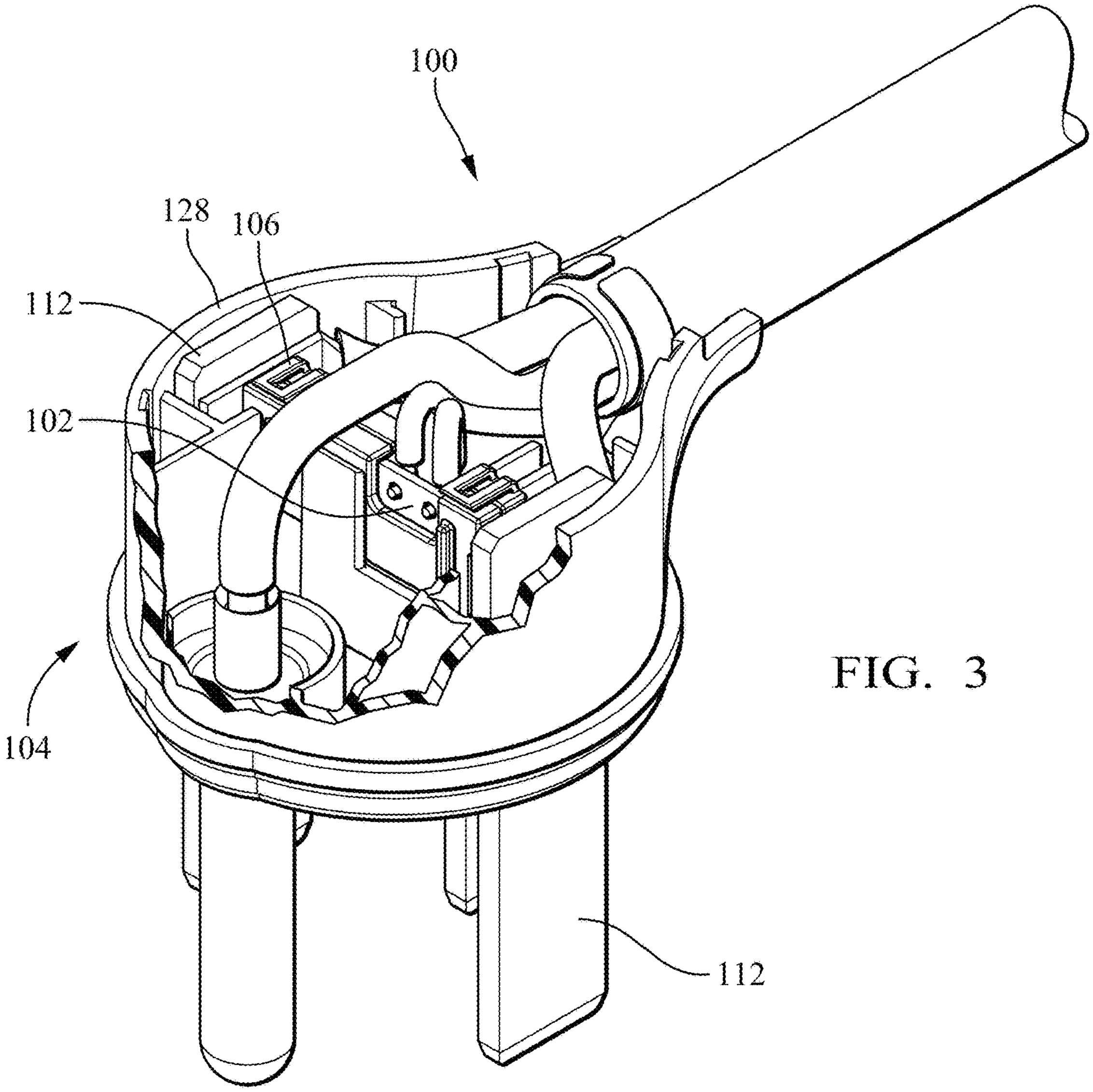
FIG. 3 shows a cut-away isometric view of another power cord for electric vehicle supply equipment according to some embodiments.

The power cords 100 illustrated in FIGS. 1, 2, and 3 include a printed circuit board assembly, hereafter referred to as PCBA 102, which includes a microcontroller and other electronic devices, such as thermistors, which are configured to measure the temperature of the connector blades in the plug and digitally transmit the temperature information over a two wire connection to electrical vehicle supply equipment, hereafter referred to as EVSE, which is configured to provide electrical power from an electrical power supply, such as the electrical grid, to an electric vehicle's battery charging system. The microcontroller is also configured to digitally transmit plug configuration information to the EVSE to identify the type of electrical plug 104 at the end of the power cord 100, e.g., NEMA 5-15 as shown in FIGS. 1 and 2 or NEMA 14-50 as shown in FIG. 3, so that the EVSE is properly configured for the voltage/current limits of the power cord 100.

Figure 4:
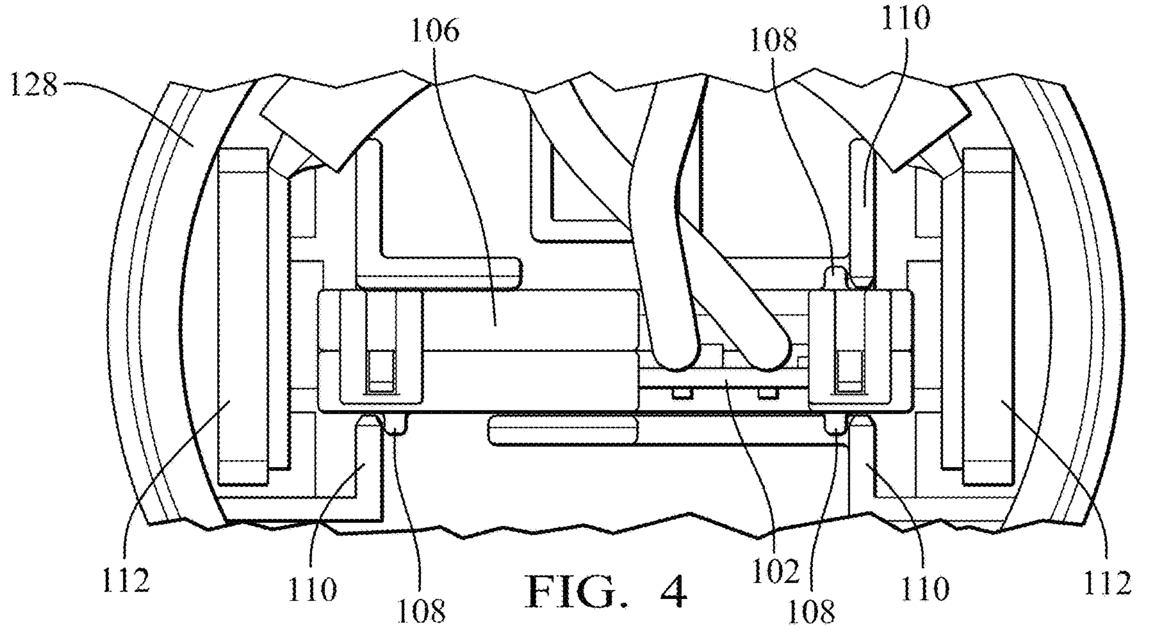
FIG. 4 shows a close-up transparent isometric view of another printed circuit board assembly in the power cord of FIG. 3 according to some embodiments.

Mounting or assembling the PCBA 102 within the electrical plug 104 can pose a risk for damage to components and functionality of the PCBA 102 due to electrostatic discharge (ESD) or other physical damage while manipulating and/or handling the PCBA 102 during the process of assembling the electrical plug 104. Therefore, the PCBA 102 is inserted within a protective PCBA housing 106 that provides physical and ESD protection for the PCBA 102. The PCBA housing 106 also includes locating features 108 in the form of grooves that engage with corresponding features 110 in the form of ribs in the plug body shown in FIG. 4 to positively locate the thermistors in relation to the connector blades 112 of the electrical plug 104. While the particular example of the location features includes grooves in the PCBA housing and ribs in the plug body, other embodiments may be envisioned in which the ribs are defined by the PCBA housing, and the corresponding grooves are defined by the plug housing.

Figure 5A:
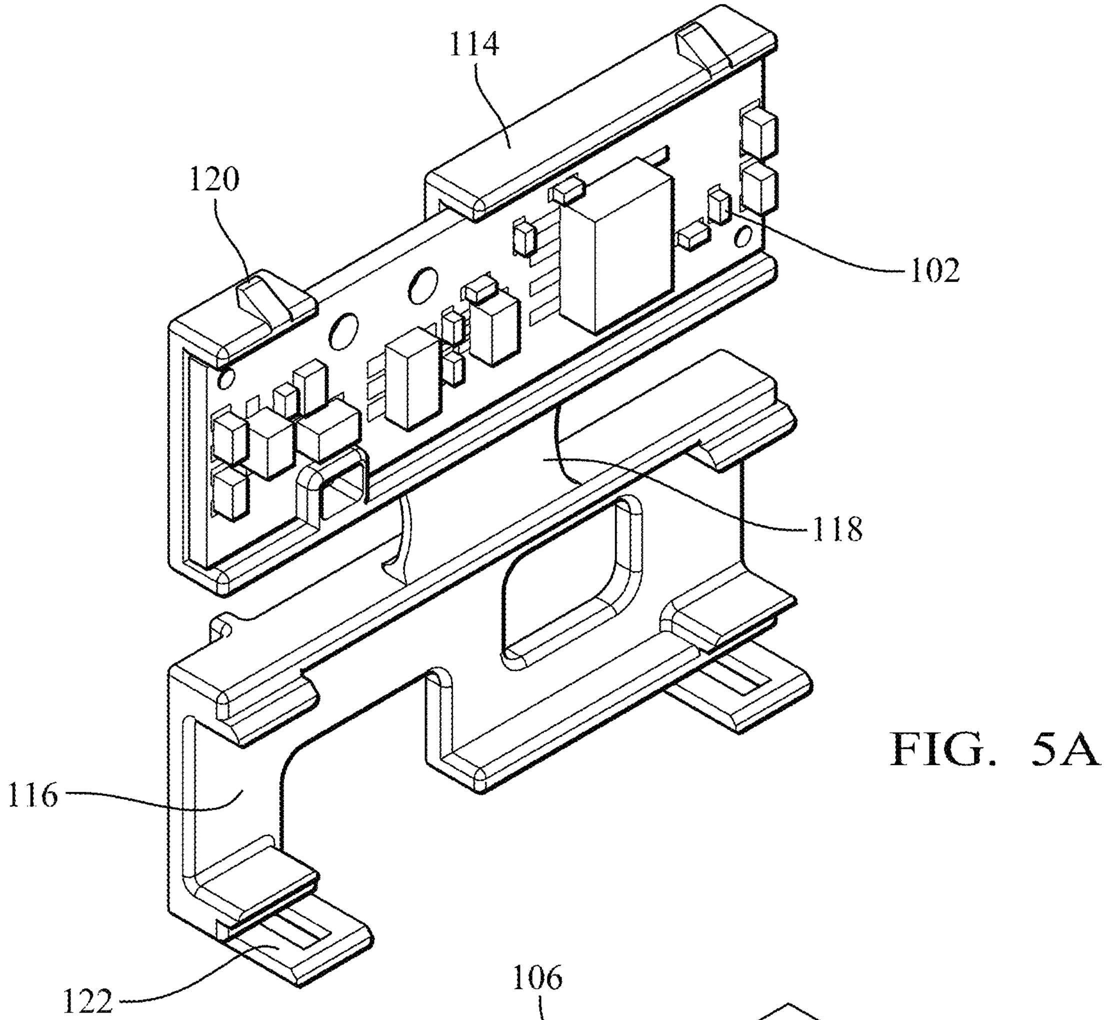
FIG. 5A shows an isometric view of printed circuit board assembly of FIG. 4 with a case in an open condition according to some embodiments.
Figure 5B:
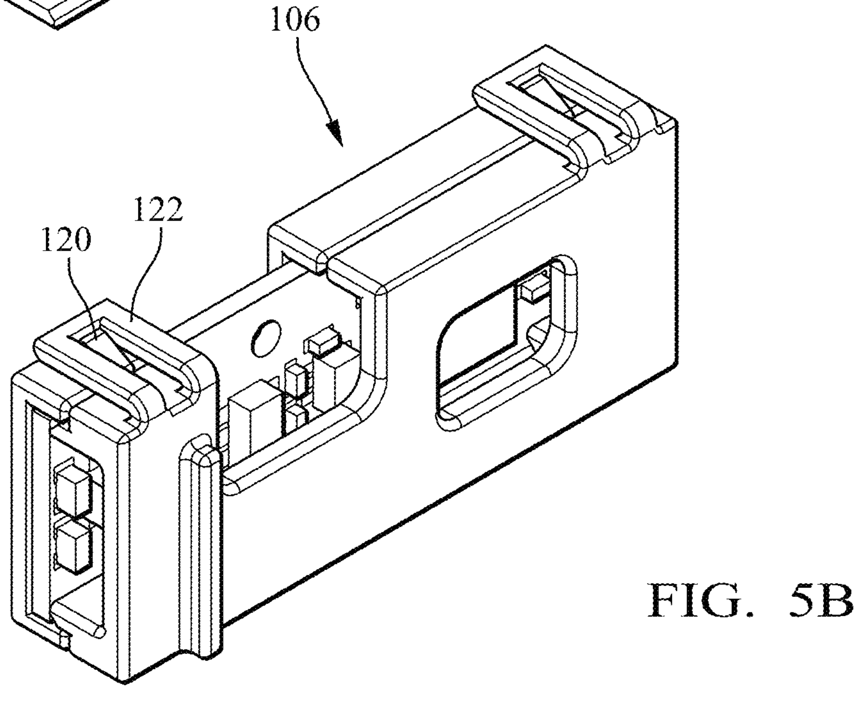
FIG. 5B shows an isometric view of the printed circuit board assembly of FIG. 5A with the case in a closed condition according to some embodiments.

The PCBA housing 106 has a case portion 114 in which the PCBA 102 is received and a cover portion 116 connected to the case portion 114 by a living hinge 118 that encloses the PCBA 102 within the PCBA housing 106 when locking features 120 on the case portion 114 engage and latch to corresponding locking features 122 on the cover portion 116 as shown in FIGS. 5A and 5B.

Figure 6B:
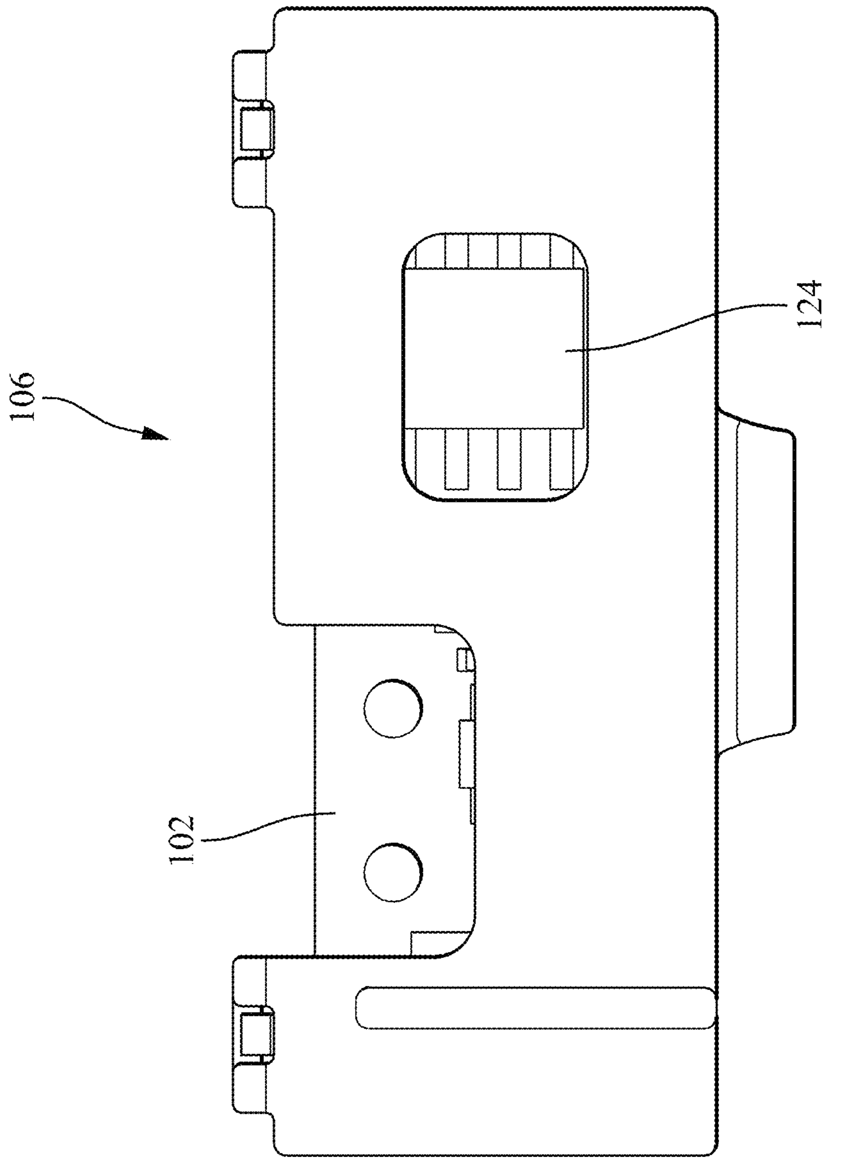
FIG. 6B shows a front view of the printed circuit board assembly of FIG. 5A according to some embodiments.
Figure 6A:
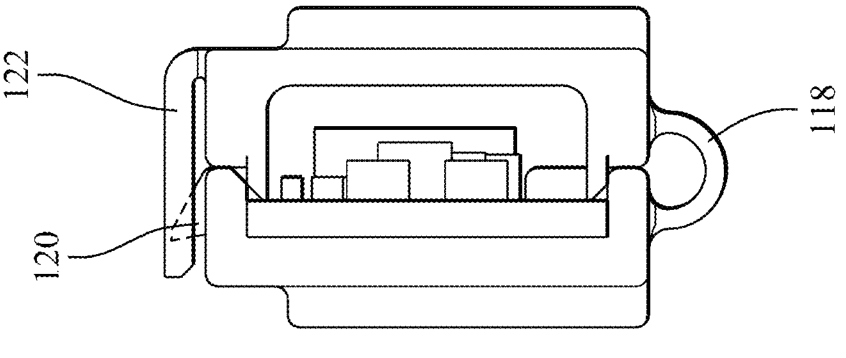
FIG. 6A shows an end view of the printed circuit board assembly of FIG. 5A according to some embodiments.

As shown in FIGS. 2, 6A, and 6B, the PCBA housing 106 includes a positive locking window/core-out 124 which engages with a mating lock feature 126 in the plug housing 128 that provides secure mounting of the PCBA housing 106 into the plug housing 128.

Further, as can be seen by comparing FIGS. 1 and 3, the size and shape of the PCBA 102 and PCBA housing 106 may be adapted to the particular shape and size required by the plug configuration.

The power cord 100 presented herein allows the EVSE to use a common interface for various power cord configurations since the microcontroller in the power cord identifies the plug type over the two wire digital interface and the EVSE can automatically configure itself for proper operation with that plug type. The microcontroller also provides the connector blade temperature data over the same two wire digital interface, thereby reducing the number of wires required in the power cord. The PCBA housing 106 provides protection to the PCBA 102 prior to installation in the power cord 100.

The illustrated embodiments conform to the NEMA 5-15 and 14-50 standards. However, other embodiments of the invention that conform to different technical standards, such as Europlug CCE 7/16, British Standard (BS) 1363, Australian/New Zealand Standard AS/NZS 3112, or Chinese PPCS-CCC technical standards, but especially to plugs having parallel connector blade terminals, e.g., NEMA 5-15P, 6-15P, 6-30P, and 6-50P may be envisioned that provide similar benefits.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. Electric vehicle supply equipment, comprising:

a power cord configured to be disconnected from and reconnected to the electric vehicle supply equipment;

a printed circuit board assembly disposed within a plug of the power cord having an electronic controller configured to transmit data regarding a connector blade configuration of the plug; and a printed circuit board assembly housing enclosing the printed circuit board assembly, wherein the printed circuit board assembly housing is disposed within a plug housing of the plug, wherein the printed circuit board assembly further includes an electronic temperature sensor in communication with the electronic controller and located proximate to a connector blade of the plug and wherein the electronic controller is configured to output temperature data of the connector blade based on a signal provided by the electronic temperature sensor and wherein the printed circuit board assembly housing defines locating features in the form of ridges or grooves that cooperate with corresponding features in the form of grooves or ridges in the plug housing to positively locate the electronic temperature sensor in relation to the connector blades of the electrical plug.

2. The electric vehicle supply equipment in accordance with claim 1, wherein the electronic controller is configured to transmit temperature data of the connector blade to the electric vehicle supply equipment via a two wire interface.

3. The electric vehicle supply equipment in accordance with claim 1, wherein the printed circuit board assembly housing is configured to locate the electronic temperature sensor relative to the connector blade within the plug housing within a predetermined dimensional tolerance.

4. The electric vehicle supply equipment in accordance with claim 1, wherein the printed circuit board assembly housing defines locating features that engage corresponding locating features in the plug housing to locate the electronic temperature sensor relative to the connector blade within the plug housing within a predetermined dimensional tolerance.

5. The electric vehicle supply equipment in accordance with claim 1, wherein the printed circuit board assembly housing includes a case portion in which the printed circuit board assembly is disposed, and a cover portion configured to enclose the printed circuit board assembly within the printed circuit board assembly housing.

6. The electric vehicle supply equipment in accordance with claim 5, wherein the case portion is connected to the cover portion by a living hinge.

7. The electric vehicle supply equipment in accordance with claim 1, wherein the printed circuit board assembly housing is configured to provide electrostatic discharge protection for the printed circuit board assembly.

8. The electric vehicle supply equipment in accordance with claim 1, wherein the printed circuit board assembly housing is configured to provide protection for the printed circuit board assembly against physical damage prior to installation of the printed circuit board assembly in the plug housing.

9. The electric vehicle supply equipment in accordance with claim 1, wherein the electronic controller is configured to transmit the data regarding the connector blade configuration of the plug of the power cord to the electric vehicle supply equipment via a two wire interface.

10. The electric vehicle supply equipment in accordance with claim 1, wherein the connector blade configuration of the plug is selected from a list consisting of National Electrical Manufactures Association 5-15P, 6-15P, 6-30P, and 6-50P, Europlug CCE 7/16, British Standard (BS) 1363, Australian/New Zealand Standard AS/NZS 3112, and Chinese PPCS-CCC technical standards.

11. The electric vehicle supply equipment in accordance with claim 1, wherein the printed circuit board assembly housing includes a positive locking window/core-out which engages with a mating lock feature in the plug housing that provides secure mounting of the printed circuit board assembly housing into the plug housing.

12. A power cord configured for use with electric vehicle supply equipment, comprising:
- a printed circuit board assembly having an electronic controller configured to transmit data regarding a connector blade configuration of a plug of the power cord; and
- a printed circuit board assembly housing enclosing the printed circuit board assembly, wherein the printed circuit board assembly housing is disposed within a plug housing of the plug and wherein the printed circuit board assembly housing defines locating features in the form of ridges or grooves that cooperate with corresponding features in the form of grooves or ridges in the plug housing to positively locate the electronic temperature sensor in relation to the connector blades of the electrical plug.

13. The power cord in accordance with claim 12, wherein the printed circuit board assembly further includes an electronic temperature sensor in communication with the electronic controller and located proximate to a connector blade of the plug and wherein the electronic controller is configured to output temperature data of the connector blade based on a signal provided by the electronic temperature sensor.

14. The power cord in accordance with claim 13, wherein the printed circuit board assembly housing defines locating features that engage corresponding locating features in the plug housing to locate the electronic temperature sensor relative to the connector blade within the plug housing within a predetermined dimensional tolerance.

15. The power cord in accordance with claim 12, wherein the printed circuit board assembly housing includes a case portion in which the printed circuit board assembly is disposed, and a cover portion configured to enclose the printed circuit board assembly within the printed circuit board assembly housing.

16. The power cord in accordance with claim 12, wherein the printed circuit board assembly housing is configured to provide electrostatic discharge protection and protection for the printed circuit board assembly against physical damage prior to installation of the printed circuit board assembly in the plug housing for the printed circuit board assembly.

17. The power cord in accordance with claim 12, wherein the connector blade configuration of the plug is selected from a list consisting of National Electrical Manufactures Association 5-15P, 6-15P, 6-30P, and 6-50P, Europlug CCE 7/16, British Standard (BS) 1363, Australian/New Zealand Standard AS/NZS 3112, and Chinese PPCS-CCC technical standards.

18. A method of assembling a power cord, comprising:
- disposing a printed circuit board assembly having an electronic controller configured to transmit data regarding a connector blade configuration of a plug of the power cord and an electronic temperature sensor in communication with the electronic controller within a printed circuit board assembly housing;
- disposing the printed circuit board assembly housing within a plug housing of the plug; and
- positioning the electronic temperature sensor relative to a connector blade within the plug housing within a predetermined dimensional tolerance by engaging in the form of ridges or grooves that cooperate with corresponding features in the form of grooves or ridges in the plug housing.

19. The method in accordance with claim 18, further comprising:
- disposing the printed circuit board assembly within a case portion of the printed circuit board assembly housing; and
- enclosing the printed circuit board assembly within the printed circuit board assembly housing using a cover portion of the printed circuit board assembly housing joined to the case portion by a living hinge.

20. The method in accordance with claim 18, further comprising:
- engaging a mating lock feature in the plug housing with a positive locking window/core-out in the printed circuit board assembly housing, thereby securely mounting the printed circuit board assembly housing into the plug housing.

* * * * *